United States Patent [19]
Ramanathan et al.

[11] Patent Number: 6,076,113
[45] Date of Patent: Jun. 13, 2000

[54] METHOD AND SYSTEM FOR EVALUATING USER-PERCEIVED NETWORK PERFORMANCE

[75] Inventors: Srinivas Ramanathan, Sunnyvale; Edward H. Perry, Mountain View, both of Calif.

[73] Assignee: Hewlett-Packard Company, Palo Alto, Calif.

[21] Appl. No.: 08/827,789

[22] Filed: Apr. 11, 1997

[51] Int. Cl.[7] .................................................... G06F 11/00
[52] U.S. Cl. ........................ 709/235; 370/229; 709/224
[58] Field of Search ...................... 395/200.65; 370/229; 709/235, 230, 232, 224

[56] References Cited

U.S. PATENT DOCUMENTS

5,197,127  3/1993  Waclawsky et al. .................... 709/224

OTHER PUBLICATIONS

I. Miloucheva et al.; Protocol Mechanisms for Reliable Transmission and Flow Control on Multimedia Highways; Conf. Proc. of the 1996 IEEE 15th Annual International Phoenix Conf. on Computers and Communications; pp. 239–245, Mar. 1996.

Matthew Mathis: Windowed Ping: An IP Layer Performance Diagnostic; Computer Networks and ISDN Systems 27; pp. 449–459, 1994.

Lakshman et al.; Window–Based Error Recovery and Flow Control With a Slow Acknowledgement Channel: A Study of TCP/IP Performance; INFOCOM '97; pp. 1199–1209, Apr. 11, 1997.

Teunis J. Ott et al.; The Stationary Behavior of Ideal TCP Congestion Avoidance; DIMACS Workshop on Performance of Realtime Applications on the Internet; pp. 1–31, Aug. 22, 1996.

Tanenbaum; Structured Computer Organization, 2nd Edition; pp. 10–12, 1984.

Matt Mathis and Jamshid Madhavi, "Diagnosing Internet Congestion with a Transport Layer Performance Tool". Proceedings of INET'96 Jun., 1996.

*Primary Examiner*—Kenneth R. Coulter
*Attorney, Agent, or Firm*—Thomas X. Li

[57] ABSTRACT

A scheme of evaluating performance of a network connecting a remote terminal to a data service system is described. The scheme emulates a communication protocol to transfer data reliably and in sequence with congestion control. The communication protocol includes mechanisms for acknowledgment and retransmission and a dynamic window size. The scheme restricts the dynamic window size not to be greater than a predetermined maximum window size, and the amount of data transferred to a predetermined data transfer size, thereby accurately measuring user-perceived network throughput without significantly impacting network performance.

16 Claims, 8 Drawing Sheets

FIG. 3 --♦-- PACKET LOSS % ——— THROUGHPUT

METHOD AND SYSTEM FOR EVALUATING USER-PERCEIVED NETWORK PERFORMANCE

BACKGROUND OF THE INVENTION

1. Field of the Invention

The present invention pertains to data access networks. More particularly, this invention relates to evaluating performance as perceived by a user/subscriber of a network connected between a data service system and a target terminal with minimized test traffic in the network.

2. Description of the Related Art

An Internet or Intranet access system typically includes an Internet/Intranet service system (ISS) and an interconnect network that connects the ISS to subscriber sites. The ISS typically includes content servers that store data for transfer to the subscriber sites. The content servers typically utilize Internet applications, such as electronic mail, bulletin boards, news groups, and World Wide Web access. In addition, the ISS may have a Proxy server that allows a network administrator to restrict access to the Internet. Another use of the Proxy server is to cache frequently accessed data from the Internet. Other components that are typical of the ISS a router or routers for routing transmissions to and from subscriber sites, and to and from global Internet and other ISSs.

The interconnect network between the ISS and subscriber sites can use a number of technologies supporting a wide range of bandwidth. For instance, subscribers in their homes may connect to the ISS via dial-up telephone lines, or via high-speed alternatives such as Integrated Services Digital Network (ISDN), Asymmetric Digital Subscriber Line (ADSL), Hybrid Fiber Coax (HFC) network, or wireless Local Multi-point Distribution Service (LMDS). Whereas dial-up lines provide transfer speeds of 2.4 kbps and greater, ISDN connections reach transfer speeds of 128 kbps, ADSL and cable modem HFC networks reach speeds up to 10 Mbps. Alternatively, subscribers in a corporation or school may use conventional local area network (LAN) technologies such as Ethernet and FDDI that support bandwidth from 10 Mbps to 100 Mbps.

However, when data transmitted over the interconnect network includes not only text files, but graphics, video and/or audio files as well, network traffic over the interconnect network is certainly increased significantly. In fact, the recent rapid growth of Internet applications, such as the World Wide Web, has significantly increased the amount of network traffic, leading to network congestion. The network congestion typically results in longer wait or inability to access the ISS from the subscribers' sites. Longer wait times may also be caused by packet errors introduced during transmissions by noise problems in the interconnect network (This is especially true for network technologies such as HFC, LMDS, and ADSL).

To maintain subscribers' satisfaction, it is necessary to monitor or evaluate the performance of the Internet/Intranet access system. Subscribers perceive performance of such a system in various ways. Data transfer (or network) throughput is one of the predominant measures of performance as perceived by a subscriber. Data transfer throughput refers to the rate at which data is reliably transferred between the ISS and a subscriber's terminal (i.e., computer or modem) via the interconnect network. For example, when a subscriber initiates a file transfer using the File Transfer Protocol (FTP), data transfer throughput is the ratio of the bytes transferred by the FTP to the total time taken for the file transfer. This computation of throughput takes into account any retransmissions that the lower Transmission Control Protocol (TCP) layer performs to ensure reliable delivery of data from the ISS to the subscriber's terminal.

Testing tools have been developed for monitoring the data transfer throughput. Typically, many of these tools (e.g., the public domain netperf tool) assess achievable throughput by simulating traffic over TCP connections established on the interconnect network between the ISS and the subscriber terminal (i.e., active throughput testing). One disadvantage associated with this type of active throughput testing is that support for special applications at the servers and/or subscribers' sites is typically required, solely for the purpose of monitoring throughput.

An alternative approach to the active throughput testing is to use passive monitoring. One example of such an approach is to instrument the FTP and HTTP (Web) servers to measure throughput during subscribers' data transactions to these servers. Although it measures the data transfer throughput without generating additional traffic, this approach is effective only when subscribers actively access the FTP and HTTP servers. Moreover, throughput as measured by this approach may be limited by the FTP and HTTP servers themselves and is therefore not an accurate measurement of the network performance.

One prior art active throughput testing tool, Treno (Traceroute Reno, developed at the Pittsburgh Supercomputing Center), overcomes the drawbacks of the above described approaches. Treno is executed from the ISS to measure downloading rates. Treno implements TCP-like algorithms in the application to avoid reliance on software support at subscribers' terminals. Treno uses UDP (User Datagram Protocol) packets of equal size as TCP data packets to emulate TCP's transport of information. By targeting these packets to unused ports on a subscriber's terminal, Treno evokes small ICMP (Internet Control Message Protocol) port unreachable error messages from the subscriber's terminal that are similar in size to TCP's generation of acknowledgments for data packets during a data transfer. By continuing to double the number of packets outstanding, Treno emulates the behavior of TCP during a data transfer. To emulate TCP's behavior when packet losses occur, either due to noise effects at the physical layer of the network, or due to network congestion, Treno implements back-off and retransmission algorithms that emulate TCP behavior.

One disadvantage of Treno is that Treno estimates the maximum throughput that a network can offer without any constraint being imposed based on the subscriber's terminal. This means that Treno does not impose a restriction on the TCP window size in use. As is known, typical TCP implementations at the ISS and the subscriber's terminal impose a bound on the TCP window size. Many personal computers bound this value to 8K bytes and the majority of workstations support window sizes up to 32K bytes. The TCP window size in use during a data transfer significantly impacts the network throughput observed by the subscribers. The effect of using different window sizes is best illustrated in FIG. 1. FIG. 1 shows the contrast between performance observed on the same network when using different maximum window size bounds. As can be seen from FIG. 1, the larger window size offers much higher network throughput in most cases.

Because Treno does not impose a restriction on the window size in use, it is clear from FIG. 1 that Treno can significantly overestimate subscriber-perceived data transfer throughput. A further drawback of using unrestricted window size is that this typically causes the network to be flooded with test traffic which may significantly impact the performance observed by subscribers during the time the network is being tested. Consequently, rather than measuring subscriber satisfaction, the use of Treno may cause further subscriber dissatisfaction because of its impact on the network.

SUMMARY OF THE INVENTION

One feature of the present invention is to minimize test traffic in a network when evaluating data transfer throughput of the network.

Another feature of the present invention is to accurately evaluate user-perceived network performance of a network with minimized test traffic in the network.

A further feature of the present invention is the ability to measure throughput observed by users by testing to user terminals or to special targets nodes in the network, without requiring any special software support at the user terminals or the target nodes.

A scheme of evaluating performance of a network connecting a remote terminal to a data service system is described. The scheme emulates a communication protocol that transfers data reliably and in sequence with congestion control. The communication protocol includes mechanisms for acknowledgment and retransmission and a dynamic window size. By restricting the dynamic window size not to be greater than a predetermined maximum window size, and by restricting the test to only transfer a predetermined maximum amount of data, the scheme accurately estimates user-perceived network throughput without impacting the network performance.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
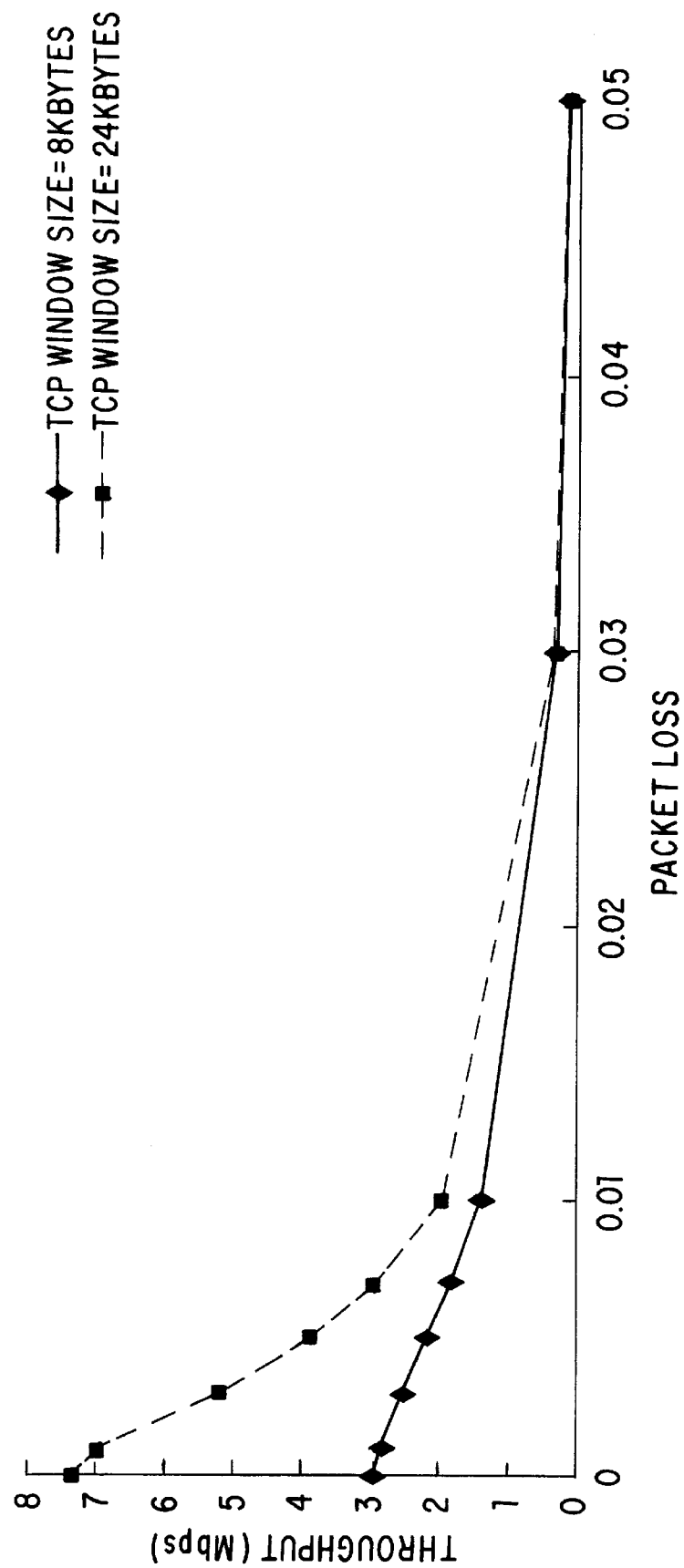
FIG. 1 shows the throughput to packet loss curves for two different TCP window sizes.
Figure 2:
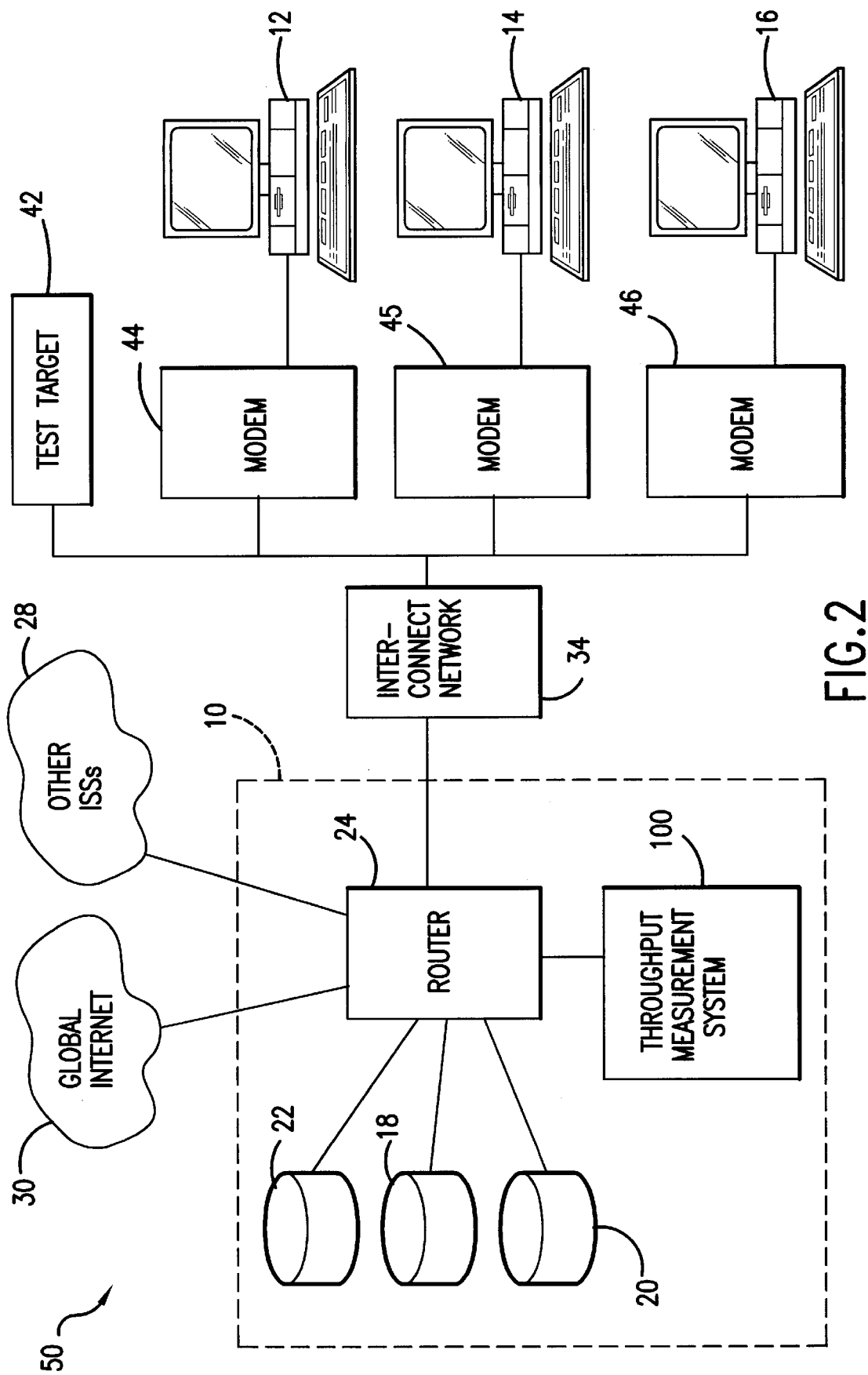
FIG. 2 is a block diagram of a data access network, wherein the network includes a network service system having a throughput measurement system in accordance with one embodiment of the present invention.

FIG. 2 shows a data access network system 50 that includes a data service system 10. The data service system 10 can be an Internet/Intranet service system (i.e., ISS) in one embodiment. The ISS 10 includes a throughput measurement system 100 that implements one embodiment of the present invention, which will be described in more detail below.

In addition to the ISS 10, the data access network system 50 also includes connections to a global Internet 30 and other ISSs 28 connected to the ISS 10. The other ISSs 28 may also include online service systems, such as America Online and Compuserve.

The ISS 10 provides Internet or Intranet service to subscriber sites 12, 14, and 16 via an interconnect network 34. The ISS 10 may be within the premises of a cable operator, or may be a central office of a telephone carrier, or may be a local area network of a corporation, but this is not critical to the invention. The subscriber sites may include terminals of subscribers/users located at the residences, schools, or offices of the subscribers/users.

The interconnect network 34 can be any known network. In one embodiment, the interconnect network 34 is a LAN (Local Area Network) network using technologies such as Ethernet, FDDI, 100-VG, 100BaseT, and Asynchronous Transfer Mode (ATM). In another embodiment, the interconnect network 34 is a WAN (Wide Area Network) such as a T-1 or T-3 link. In other embodiments, the network 34 can be an access network to the home, such as an ISDN (Integrated Services Digital Network) network, an ADSL (Asymmetric Digital Subscriber Line) network, a HFC (Hybrid Fiber Coaxial) network, or a wireless LMDS (Local Multi-point Distribution Service) network. Alternatively, the interconnect network 34 can be other known network.

Each of the subscriber sites 12, 14, and 16 may include a personal computer, a network computer, a notebook computer, a workstation, a mainframe computer, a supercomputer, or any other type of data processing system. At the subscriber sites, modems 44–46 and or other network adapters (not shown) in modems' place receive and transmit data over the interconnect network 34. For example, in a broadband application, broadband modems (e.g., cable modems for a hybrid fiber coaxial cable network) transmit requests for data and receive data in accordance with known technology. The modems 44–46 can be located within or outside of their respective computers. The modems 44–46 may not be needed when the interconnect network 34 is, for example, a LAN network.

The subscriber sites can serve as target sites for throughput measurements by the throughput measurement system 100. Alternatively, the target sites may also be test targets specifically installed in the ISS 10 to permit testing of the interconnect network 34. FIG. 2 only shows one test target 42 associated with the interconnect network 34. In practice, many more test targets may be used. Like the subscriber terminals, the test targets (e.g., test target 42) also have network addresses, but they do not execute any additional special purpose software. The test targets perform known functions and have known performances.

Because a test target is guaranteed to be operational all the time, and because the performance of the test target is known, by executing throughput tests to the test targets periodically, the throughput measurement system 100 can estimate the performance of the network 34 over time. By placing the test targets at carefully selected locations in the ISS 10 (e.g., on each of the branches of the hybrid fiber coaxial (HFC) cable interconnect network), the throughput measurement system 100 can test specific places in the network 34 more accurately.

The ISS 10 includes a router 24 for routing data to and from the subscriber sites 12, 14 and 16 upon receiving a request from a subscriber/user. The router 24 functions to connect the subscriber sites 12, 14 and 16 to the appropriate on-premises servers 18, 20 and 22, or to the global Internet 30 or the other ISSs 28. The router 24 may operate in the Asynchronous Transfer Mode (ATM) to provide high bandwidth packet-based switching and multiplexing.

The ISS 10 also includes content servers 18 and proxy servers 20. In addition, the ISS 10 includes other servers 22. The other servers 22 may include DNS (Domain Name Server), DHCP (Dynamic Host Configuration Protocol), and NAT (Network Address Translator) servers. The content servers 18 support a variety of Internet applications, including World Wide Web access, electronic mail, bulletin boards, news groups and FTP access, all of which rely on the TCP/IP protocols for communication between the ISS servers and the remote terminals. The proxy servers 20 may be used to enhance security of accesses to and from the subscriber sites 12, 14, and 16, as well as to speed up Internet access by caching frequently accessed data locally. All of the servers 18, 20, and 22 are well known in the art.

In the ISS 10, the throughput measurement system 100 is connected to router 24. The throughput measurement system 100 can access servers 18, 20, and 22 via the router 24. In another embodiment, the throughput measurement system 100 can be directly connected to the access servers 18, 20, and 22. The throughput measurement system 100 can also access the subscriber sites 12, 14, and 16 and the test targets 42 via the router 24 and the interconnect network 34. The throughput measurement system 100 can also be placed at other locations in the data access network system 50. For example, the throughput measurement system may be located in the global Internet 30 or in the other ISSs 28 to measure the throughput to and from the global Internet and other ISSs.

The throughput measurement system 100 evaluates subscriber perceived network performance between the IS 10 and the subscriber sites 12, 14, and 16 and test target 42. These sites can be referred to as target sites. As will be described in more detail below, the throughput measurement system 100 emulates data transfers over TCP using the User Datagram Protocol (UDP) and Internet Control Message Protocol (ICMP) to transmit and receive packets, respectively, from the target sites 12, 14, 16, and 42, and calculates data transfer throughput to the target sites 12, 14, 16 and 42 with a restriction on the TCP window size. Data transfer throughput is the rate at which the system transfers data to and from the target sites 12, 14, 16 and 42. Throughput monitoring provides a means for evaluating the network performance.

The throughput measurement system 100 first selects a target site (e.g., subscriber site 12) for evaluation. The throughput measurement system 100 determines the maximum TCP window size setting to use for the throughput measurements either based on the network address of the subscriber site 12, or based on a pre-specified value (chosen based on typical maximum TCP window size settings at the subscriber sites 12, 14, and 16). As is known, the TCP window size indicates the number of unacknowledged data packets. The throughput measurement system 100 determines the maximum number of packets to be transmitted during the measurement. The throughput measurement system 100 then starts the evaluation process by sending UDP packets under a specified TCP window (or socket buffer) size to the target site 12. To emulate data transfers from the ISS servers 18, 20, and 22 to the target site 12, the throughput measurement system 100 uses UDP packets that are of the same size as TCP data packets, and targets these UDP packets at unused ports on the target site 12. These UDP packets evoke small ICMP error messages that emulate TCP acknowledgments for data packets from the target site 12. Based on the acknowledgments it receives, the throughput measurement system 100 emulates TCP congestion control algorithms (i.e., dynamically increasing or decreasing the window size based on the transmission result). The throughput measurement system 100 always makes sure that the dynamic window size used in the measurement is not greater than the predetermined maximum TCP window size (i.e., the TCP window size decided at the beginning of the measurement). By imposing a restriction on the dynamic TCP window size and by restricting the duration of the test to the transmission of a pre-specified maximum number of data packets, the amount of bandwidth consumed during testing is restricted accordingly. This thus allows the throughput measurement system 100 to actively test the target sites 12, 14, 16, and 42 without flooding the interconnect network 34 with test packets. In addition, by setting the maximum TCP window size to the typical maximum window size setting of the remote site, the throughput measurement system 100 can emulate a typical data transfer and thereby, measure the network throughput accurately.

The test terminates either when the pre-specified maximum number of data packets have been transmitted or when a pre-specified maximum duration of the test is exceeded. At the end of the test, the throughput measurement system 100 reports the measured user-perceived throughput as well as the packet loss percentage seen during the test.

Figure 3:
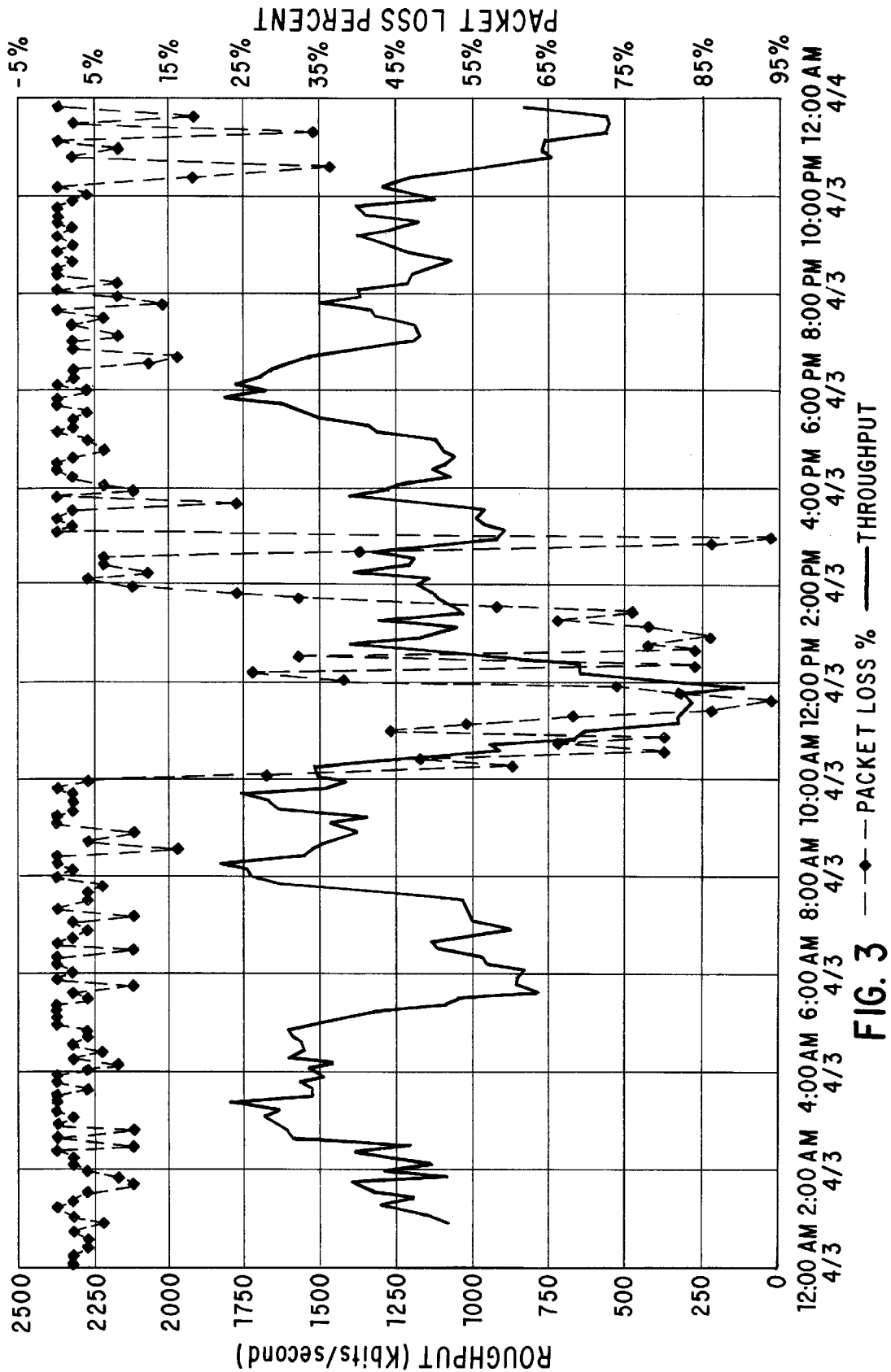
FIG. 3 shows the performance of hybrid fiber coaxial access network measured by the throughput measurement system of FIG. 2.

By running throughput test periodically to different target sites 12, 14, 16 and 42, the throughput measurement system 100 measures the user-perceived performance of the interconnect network 34. A significant reduction in the measured throughput is indicative of network problems that may need further diagnosis. FIG. 3 illustrates the throughput and packet loss observed by actively testing a test target connected to a hybrid fiber coaxial cable network for a day. In this network, clearly during the period 10 am–1 pm, there is a significant drop in user-perceived network performance.

Because the throughput measurement system 100 relies on the testing capabilities that are supported by any device that supports the IP (Internet Protocol), the throughput measurement system 100 can be used to measure performance of a variety of off-the-shelf devices, such as PCs, Macintosh computers, servers, and modems at the target sites 12, 14, 16, and 42 without requiring special-purpose software executing at these sites.

The throughput measurement system 100 includes a computer system (not shown) that supports the IP (Internet Protocol) and a measurement system 102 (shown in FIG. 4) that implements one embodiment of the present invention. The computer system can be any kind of computer system that is equipped with network access ability and supports the IP protocol. The measurement system 102 can be implemented by software, dedicated hardware, and/or firmware.

Figure 4:
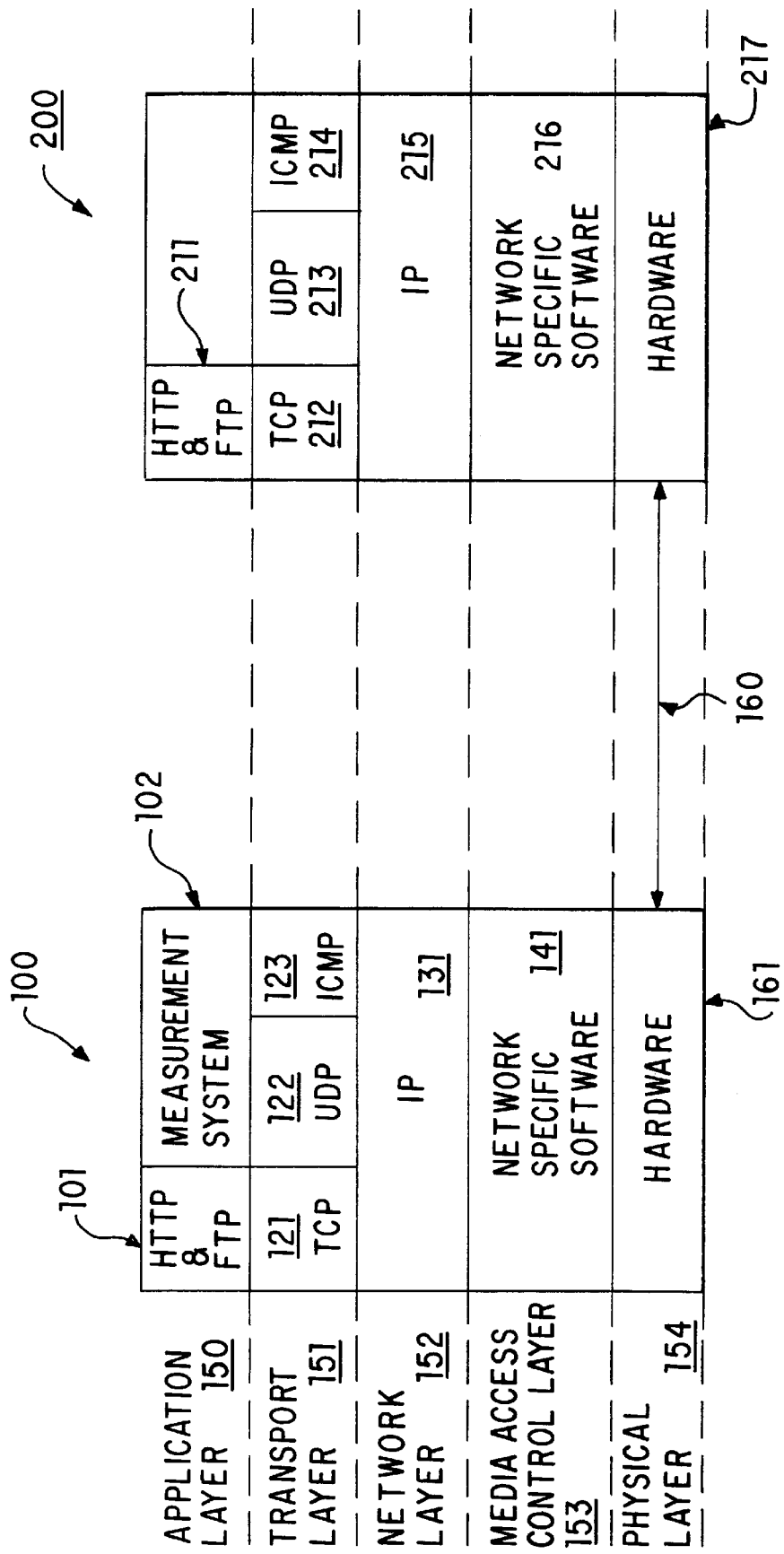
FIG. 4 shows protocol modules of the throughput measurement system of FIG. 2.
Figure 5A:
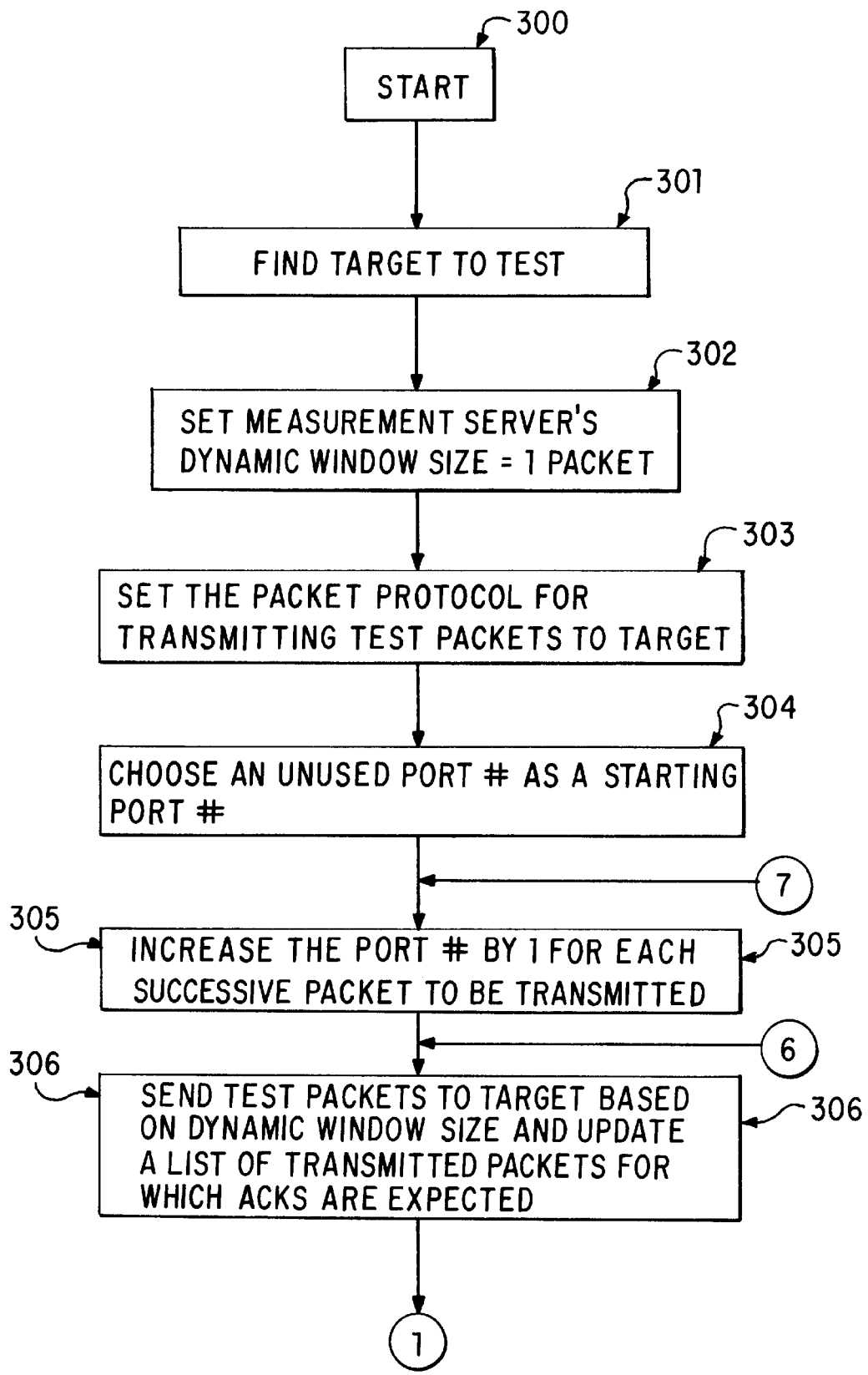
FIGS. 5A through 5D show in flow chart diagram form the process of the measurement system of FIG. 2.
Figure 5B:
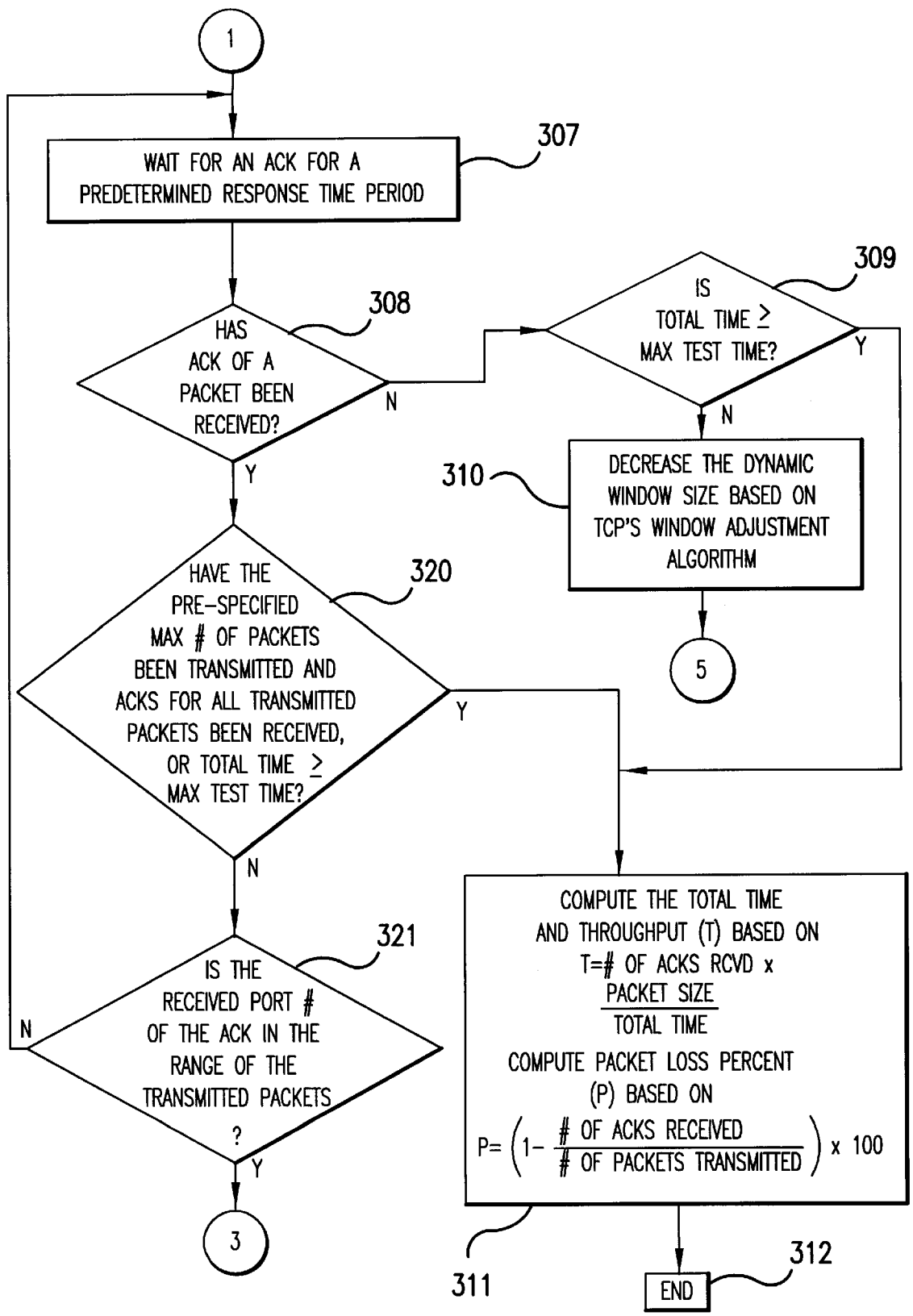
Figure 5C:
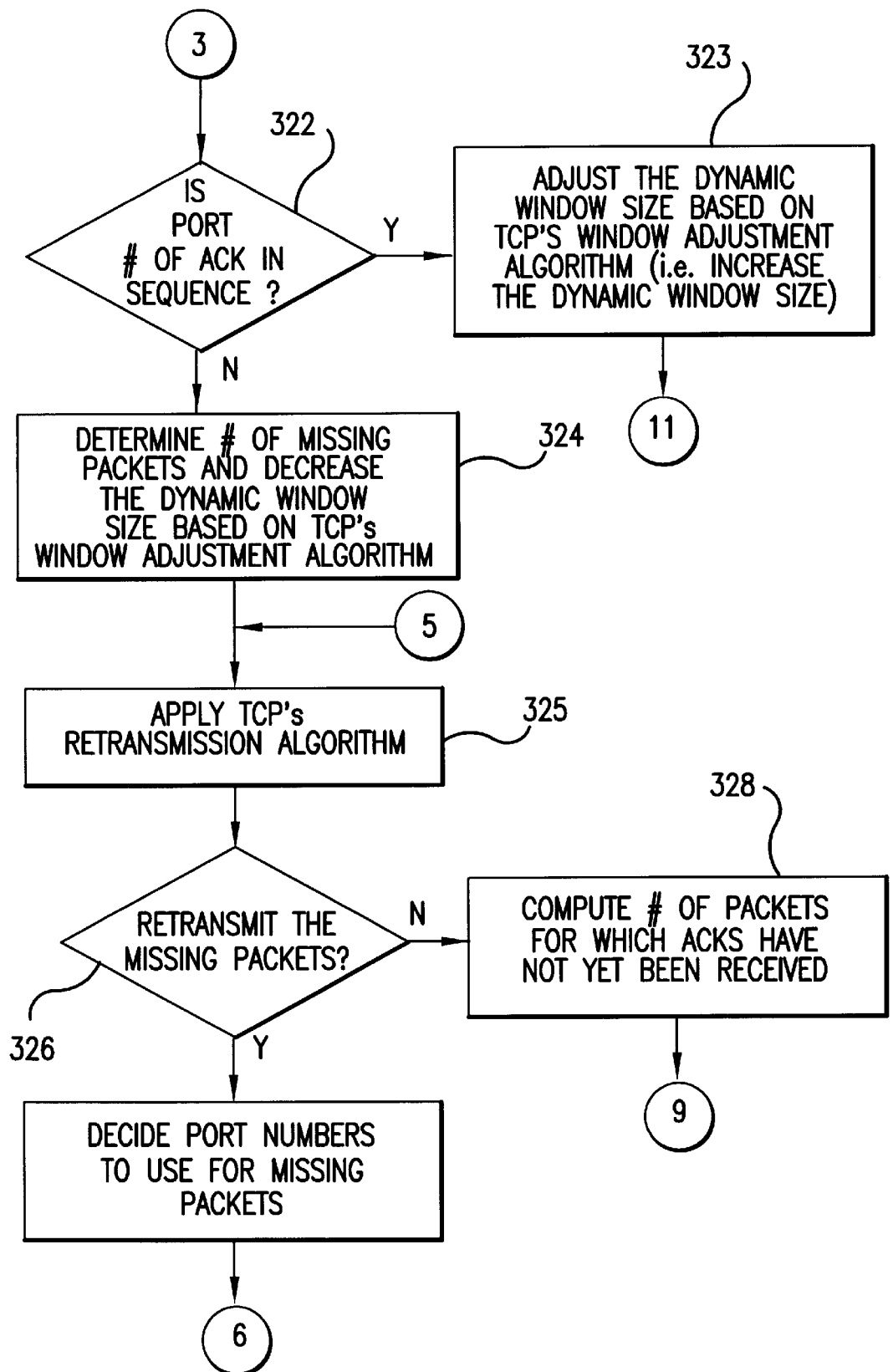
Figure 5D:
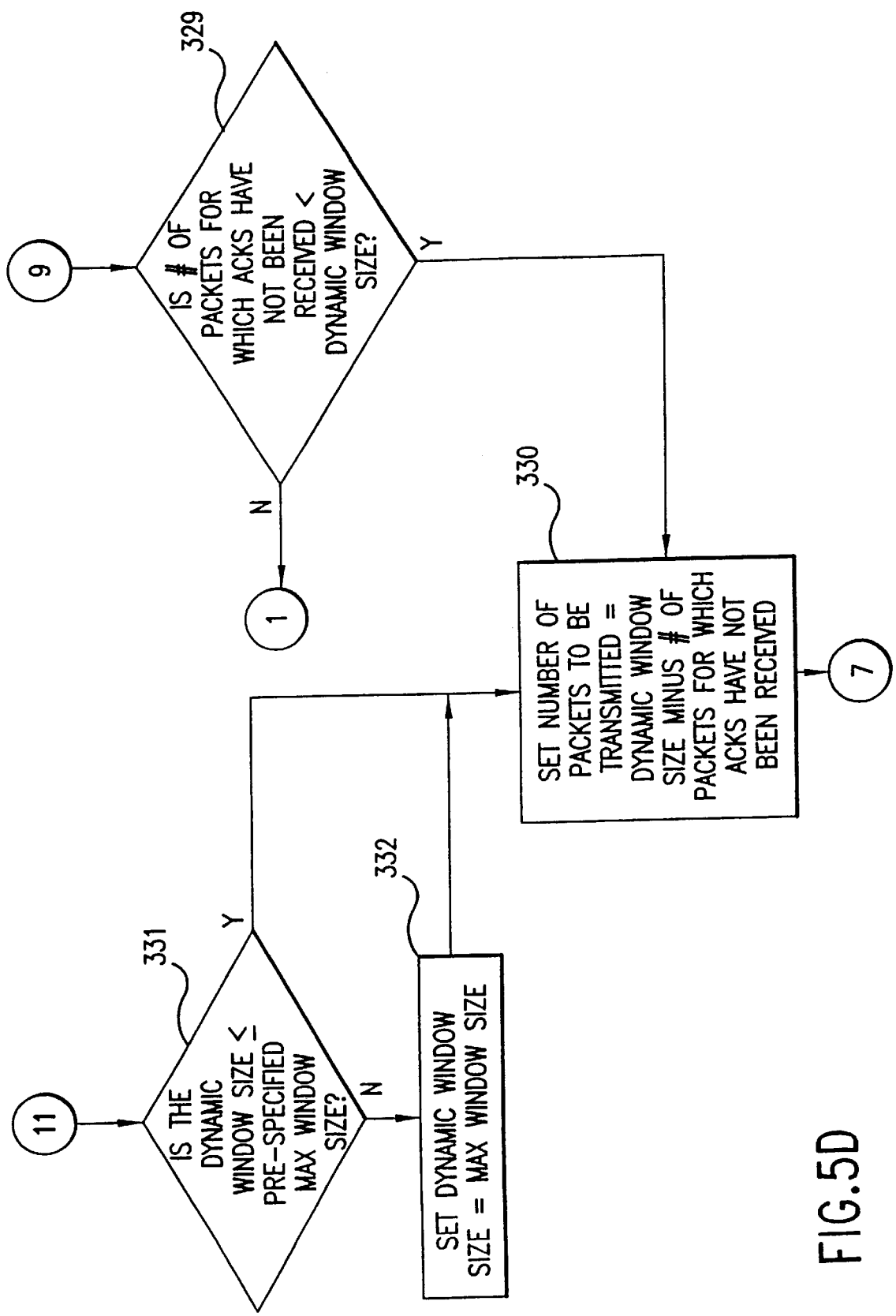

FIG. 4 shows various layers 150 through 154 of the throughput measurement system 100 and a target site 200 that can be any one of the target sites 12, 14, 16, and 42. As can be seen from FIGS. 2 and 4, the physical layer 154 indicates the hardware 161 and 217 of the throughput measurement system 100 and the target site 200, as well as the physical connection 160 of the network 34. Above the physical layer 154 is the media access control layer 153. The media access control layer 153 indicates a network specific software 141 and 216 for the throughput measurement system 100 and the target site 200. The network specific software programs 141 and 216 are specific to the network technology used. Above the media access control layer 153 is the network layer 152. At this layer, both the throughput measurement system 100 and the target site 200 employ the IP protocol (i.e., 131 and 215). The throughput measurement system 100 also includes UDP 122, and ICMP 123 at the transport layer 151 which is above the network layer 152. In addition, although not essential for the throughput measurements, the throughput measurement system 100 may also include TCP 121 transport layer. Likewise, the target site 200 includes UDP 213, and ICMP 214 at the transport layer 151. The TCP layer 212 is optional. Above the transport layer 151 lies the application layer 150. At this layer, the throughput measurement system 100 includes the measurement system 102 that is above the UDP 122 and ICMP 123. In addition, the throughput measurement system 100 optionally includes HTTP and FTP applications 101 that are above the TCP 121. The target site 200, however, does not include any special-purpose software above the UDP 122 and ICMP 123 to support the throughput measurements. Although not critical to throughput measurements, the target site 200 may include HTTP and FTP applications 211 above the TCP 212. This is again optional.

FIGS. 5A–5D show in flow chart diagram form the process of the measurement system 102 in accordance with one embodiment of the present invention. As can be seen from FIGS. 5A–5D, the process starts at step 300. At step 301, the target site (e.g., subscriber site 12) is located by the measurement system 102. Once the target site is determined, the measurement system 102 then determines the maximum window size setting to use for the measurement. This value is then used as the maximum TCP window size of the measurement system 102 during testing. The measurement system 102 also determines the packet size, the number of packets to be transmitted, and the maximum test time (i.e., the maximum time allowed for transmission).

At step 302, the measurement system 102 initially sets a dynamic window size that it uses to emulate TCP to one packet. Alternatively, the measurement system 102 may sets its initial window size to a value that is greater or less than one, depending on the protocol and its specific implementation that is to be emulated. At step 303, the measurement system 102 decides the packet protocol for transmitting the test packets to the target remote site. In one embodiment, the packet protocol employed is the UDP/ICMP protocols. Alternatively, other known data transfer protocols can be used.

At step 304, an unused port number is selected as the starting port number of the packets to be transmitted. The port number is used here to identify the sequence of the packets to be transmitted. At step 305, the port number is incremented by one for each successive packet to be transmitted. Then the packets are sent to the target remote site based on the specified window size at step 306. As the packets are transmitted, the list of transmitted packets for which acknowledgments (ACKs) are expected in the measurement system 102 is updated (In the current context, the term ACK refers to ICMP unreachable error messages from the target site that emulate TCP acknowledgments). Then step 307 is executed at which the measurement system 102 waits for an ACK to arrive within a predetermined response time period. The response time period itself may also be dynamically updated by the measurement server, by measuring the delay between transmission of a packet and the receipt of the corresponding ACK.

Step 308 is a judgement step that follows step 307. If, at step 308, it is determined that the ACK of any transmitted packet has not been received within the predetermined response time (this means that some packets or their ACKs have been lost during transmission over the network), the process goes to step 309. Otherwise, the process continues at step 320.

At step 309, it is determined whether the total time from the start of the test is greater than or equal to the predetermined maximum test time. If the answer is no, then step 310 is executed to decrease the dynamic window size and then retransmit the packets. If the answer is yes, then step 311 is executed.

At step 310, the dynamic window size is decreased in accordance with a TCP's window adjustment algorithm. The TCP's window adjustment algorithm allows the dynamic window size to be increased or decreased by one, or by a magnitude of two (i.e., double or half). The process then moves to step 325. The TCP's window adjustment algorithm is known in the art.

At step 311, the total time from the start of the test is obtained and the user-perceived throughput is computed by multiplying the number of ACKs received with the size of the data packets and dividing by the total time for the measurement. This means that the data transfer throughput is obtained at this step. Based on the ACKs received and the packets transmitted, the packet loss percentage during the test is also computed. The process then ends at step 312.

Step 320 is also a judgement step that determines whether the pre-specified number of packets have been transmitted and ACKs are received in the measurement system 102 for all transmitted packets, or alternatively whether the total time is greater than or equal to the maximum test time. If the answer is yes for either question, then step 311 is executed. Otherwise, step 321 is executed to determine if the received port number of the ACK is in the range of the port numbers of the transmitted packets. If the answer is no (indicating that an unexpected ACK has been received by the measurement system 102), the process returns to step 307 to continue its wait. Otherwise, step 322 is executed to determine if the port numbers of the ACK are in sequence. If, at step 322, it is determined that the port numbers of the ACKs are in sequence (indicating that the transmitted packets are being received by the target site without any loss), the dynamic window size needs to be increased and step 323 is executed. If the answer is no, it means that packet loss has probably occurred and the dynamic window size needs to be reduced at step 324.

At step 323, the dynamic window size is increased in accordance with the TCP window adjustment algorithm. Then step 331 is executed.

At step 324, the number of missing packets (i.e., the number of transmitted packets that may have been lost during transmission over the network) is determined and the dynamic window size is decreased if necessary (this is determined based on TCP's window size adjustment algorithm). At step 325, the TCP retransmission algorithm is applied. Then step 326 is executed, at which it is determined whether to retransmit the missing packets. If the answer is no, step 328 is then executed. If the answer is yes, step 327 is then executed to decide the port numbers to use for retransmitting the missing packets. The process then returns to step 306 to send the missing packets.

At step 328, the number of packets for which ACKs have not yet been received by the measurement system 102 is computed. Then step 329 is executed to determine if additional packets can be transmitted by comparing the number of packets for which ACKs have not been received with the dynamic window size. If the answer is no, then the process returns to step 307. If the answer is yes, then step 330 is executed to set the number of packets to be transmitted to be equal to the dynamic window size minus the number of unacknowledged packets. Then the process returns to step 305.

Step 331 follows step 323. Step 331 determines whether the increased dynamic window size is still less than or equal to the predetermined TCP's maximum window size. If yes, the process moves to step 330. If the answer is no, then the increased dynamic window size is reset to equal to the maximum window size. Steps 331 and 332 provide a mechanism that allows the testing to emulate the behavior of TCP as it impacts the users. These steps also ensure that the testing does not flood the interconnect network 34 while accurately measuring the network throughput.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A computer implemented method of evaluating performance of a network connecting a terminal to a data service system, comprising:
    (A) detecting a predetermined maximum window size of the terminal from the data service system via the network;
    (B) emulating a communication protocol to transfer data reliably and in sequence with congestion control between the data service system and the terminal via the network, wherein the communication protocol includes mechanisms for acknowledgment and retransmission and a dynamic window size;
    (C) restricting the dynamic window size not to be greater than the predetermined maximum window size of the terminal during emulation of the communication protocol.

2. The method of claim 1, further comprising the step of restricting the data transfer not to exceed a predetermined maximum amount of data.

3. The method of claim 1, wherein the network is selected from a number of network technologies comprising Ethernet, FDDI, 100-VG, 100BaseT, ATM, T-1, T-3, and a combination thereof.

4. The method of claim 1, wherein the network is selected from a number of network technologies comprising an integrated services digital network, an asymmetric digital subscriber line network, a hybrid fiber coaxial network, a wireless local multi-point distribution service network, and a combination thereof.

5. The method of claim 1, wherein the network comprises a combination of network technologies such as Ethernet, FDDI, 100-VG, 100BaseT, ATM, T-1, T-3, an integrated services digital network, an asymmetric digital subscriber line network, a hybrid fiber coaxial network, and a wireless local multi-point distribution service network.

6. The method of claim 1, wherein the terminal is a computer system.

7. The method of claim 1, wherein the terminal is a computer system with a modem.

8. The method of claim 1, wherein the terminal is one of a modem, a test target, a network adaptor.

9. An apparatus, comprising:
    (A) a storage medium;
    (B) a software program stored in the storage medium to evaluate performance of a network connecting a terminal to a data service system when executed by a computer system, the software comprising
        (I) a first set of instructions that detect a predetermined maximum window size of the terminal from the data service system via the network;
        (II) a second set of instructions that emulate a communication protocol to transfer data reliably and in sequence with congestion control between the data service system and the terminal via the network, wherein the communication protocol includes mechanisms for acknowledgment and retransmission and a dynamic window size;
        (III) a third set of instructions that restrict the dynamic window size not to be greater than the predetermined maximum window size of the terminal during emulation.

10. The apparatus of claim 9, wherein the software program further comprises a fourth set of instructions that restrict the data transfer not to exceed a predetermined maximum amount of data.

11. The apparatus of claim 9, wherein the network is selected from a number of network technologies comprising Ethernet, FDDI, 100-VG, 100BaseT, ATM, T-1, T-3, and a combination thereof.

12. The method of claim 9, wherein the network is selected from a number of network technologies comprising an integrated services digital network, an asymmetric digital subscriber line network, a hybrid fiber coaxial network, a wireless local multi-point distribution service network, and a combination thereof.

13. The method of claim 9, wherein the network comprises a combination of network technologies such as Ethernet, FDDI, 100-VG, 100BaseT, ATM, T-1, T-3, an integrated services digital network, an asymmetric digital subscriber line network, a hybrid fiber coaxial network, and a wireless local multi-point distribution service network.

14. The method of claim 9, wherein the terminal is a computer system.

15. The method of claim 9, wherein the terminal is a computer system with a modem.

16. The method of claim 9, wherein the terminal is one of a modem, a test target, a network adaptor.

* * * * *